United States Patent
Yamauchi

(10) Patent No.: US 6,678,324 B1
(45) Date of Patent: Jan. 13, 2004

(54) IMAGE INFORMATION ENCODING SYSTEM

(75) Inventor: Satoru Yamauchi, Tsuchiura (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/212,763

(22) Filed: Dec. 16, 1998

(30) Foreign Application Priority Data

Dec. 19, 1997 (JP) .............................................. 9-350792

(51) Int. Cl.[7] .................................................. H04N 7/12
(52) U.S. Cl. .................................................. 375/240.04
(58) Field of Search .............. 375/240, 240.01–240.07, 375/240.12–240.18, 240.22, 240.24; 382/238, 239, 248, 251, 253; H04N 7/32, 7/12

(56) References Cited

U.S. PATENT DOCUMENTS

| | | | | |
|---|---|---|---|---|
| 5,442,401 A | * | 8/1995 | Murakami et al. ..... | 375/240.18 |
| 5,870,145 A | * | 2/1999 | Yada et al. ............ | 375/240.04 |
| 5,892,548 A | * | 4/1999 | Kim ....................... | 375/240.04 |
| 5,982,431 A | * | 11/1999 | Chung ................... | 375/240.01 |
| 5,986,710 A | * | 11/1999 | Kim et al. .............. | 375/240.2 |
| 6,011,589 A | * | 1/2000 | Matsuura et al. ...... | 375/240.14 |
| 6,064,436 A | * | 5/2000 | Okada ................... | 375/240.16 |
| 6,081,551 A | * | 6/2000 | Etoh ..................... | 375/240.13 |
| 6,118,817 A | * | 9/2000 | Wang | |

OTHER PUBLICATIONS

The Realization of JPEG/MPEG2 (no jitsugen hou), Jul. 15, 1995, pp. 1–31, Ohmusha, Japan. No Translation.

* cited by examiner

*Primary Examiner*—Nhon Diep
(74) *Attorney, Agent, or Firm*—Bret J. Peterson; W. James Brady, III; Fredrick J. Telecky, Jr.

(57) ABSTRACT

An image information encoding system that includes detecting an image portion for which higher image quality is desired based on the motion vector value and the image error value, calculating a bit rate control value based on the detection result as well as the buffer usage rate, and changing the roughness of the quantization step based on the bit rate control value. The objective is to minimize the degradation of an image due to compression of a still image portion.

6 Claims, 3 Drawing Sheets

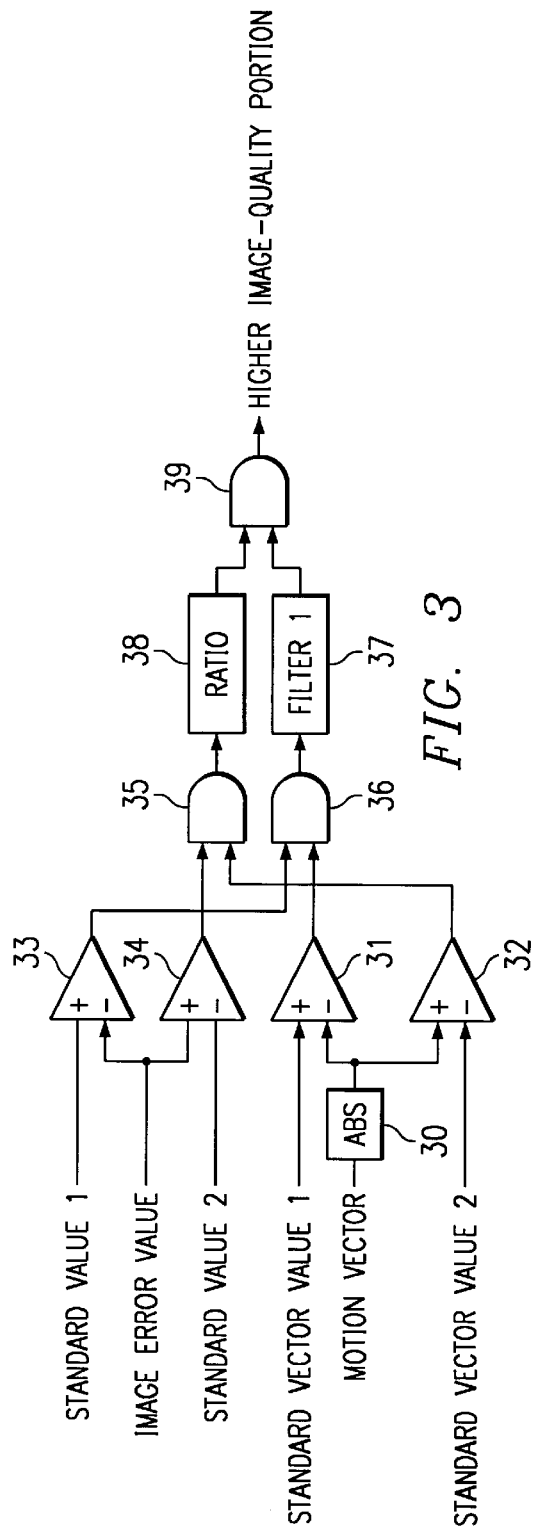
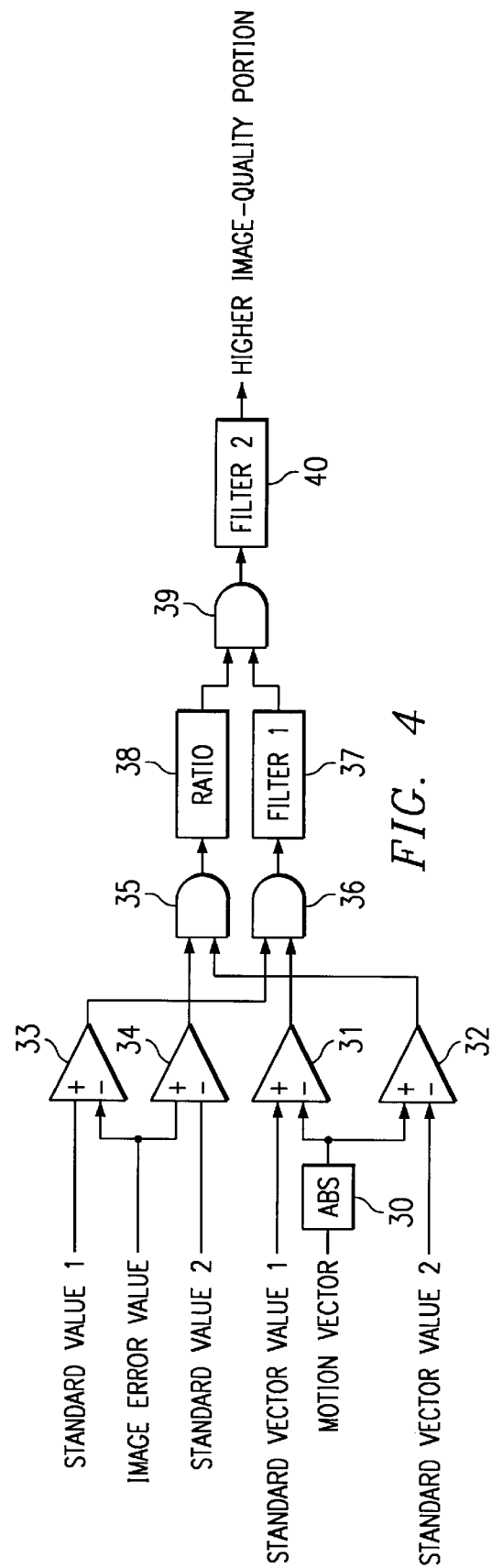

IMAGE INFORMATION ENCODING SYSTEM

FIELD OF THE INVENTION

The present invention pertains to image signal encoding; in particular, it pertains to encoding technology that can be applied to MPEG.

BACKGROUND OF THE INVENTION

Drawing 1 will be used to explain the encoding method for a conventional MPEG encoder. The coding sequence for the input original images is rearranged in picture-rearranging unit 1, and motion estimation unit 2 estimates the motion of the image over time and outputs a motion vector detected in a prescribed coding mode. Differential calculation unit 3 outputs the difference between the 'uncompressed image' output by motion estimation unit 2 and the compressed image for which the motion is predicted. DCT unit 4 DCTs that differential output, and quantization unit 5 quantizes that DCT output using a bit rate control value calculated from the usage rate for buffer 10. Variable-length coding unit 6 converts the quantization value to a variable-length code. Inverse quantization unit 7 inverse-quantizes the quantization value using the aforementioned bit rate control value, and it is inverse DCT-ed at IDCT unit 8. Multiplexer unit 9 multiplexes the outputs from variable-length coding unit 6 and motion estimation unit 2, sending the result to buffer 10, and buffer 10 stores that input and outputs that data as a bit stream. Adder unit 11 adds the output from IDCT unit 8 and the output from motion estimation unit 13. Memory 12 stores the compressed image. Motion prediction unit 13 predicts and outputs the optimal motion using the compressed image, the motion vector, and the coding mode.

As explained above, with the conventional MPEG encoding method, the bit rate control value used for quantization is calculated using only the usage rate for buffer 10, so quantization occurs independently of the picture conditions (an image with rapid motion, a still image, etc.), and a visually satisfactory image compression is not possible. For example, as in Drawing 2, when the input image is an image in which there is a fountain in the background, with multiple water motion, and there is a person standing still in the foreground, and when the visual characteristics of the person are considered, since the fountain's water is a 'moving body,' the blurring of the image is not noticeable, but the stationary person is a still image, so the blurring of the image is noticeable. With the conventional MPEG encoding method, estimation and prediction of the motion for the water portion is difficult, so the differential output from differential calculation unit 3 increases, and a large amount of information is generated by the DCT unit. In this condition, the bit rate is controlled such that the usage rate for buffer 10 is kept constant, so this is controlled by quantization unit 5. In other words, the quantization step is rough, and feedback operates such that a large amount of information is not generated with respect to the output of quantization unit 5. For the buffer usage rate, which is the feedback parameter, an average of 15 images, for example, is taken, so the roughness of the quantization step is without regard to the water portion of the image or the portion of the image with a person's face, and the person's face blurs, becoming a visually 'unsatisfactory image.'

SUMMARY OF THE INVENTION

The MPEG encoder of the present invention is characterized in that the still portions and the moving portions are detected, and the quantization step of the portion being corrected is made smaller. In addition, that decision is made using the image error value and the motion vector value from the motion estimation unit. Furthermore, in that decision a time filter is applied to the still image information. Furthermore, the standard vector value used to detect still image portions is changed according to the time difference for 2 images.

BRIEF DESCRIPTION OF THE DRAWINGS

Drawing 1 is a block diagram of the MPEG encoder for one embodiment of the present invention.

Drawing 2 is a diagram for explaining one example of an input image.

Figure 1:
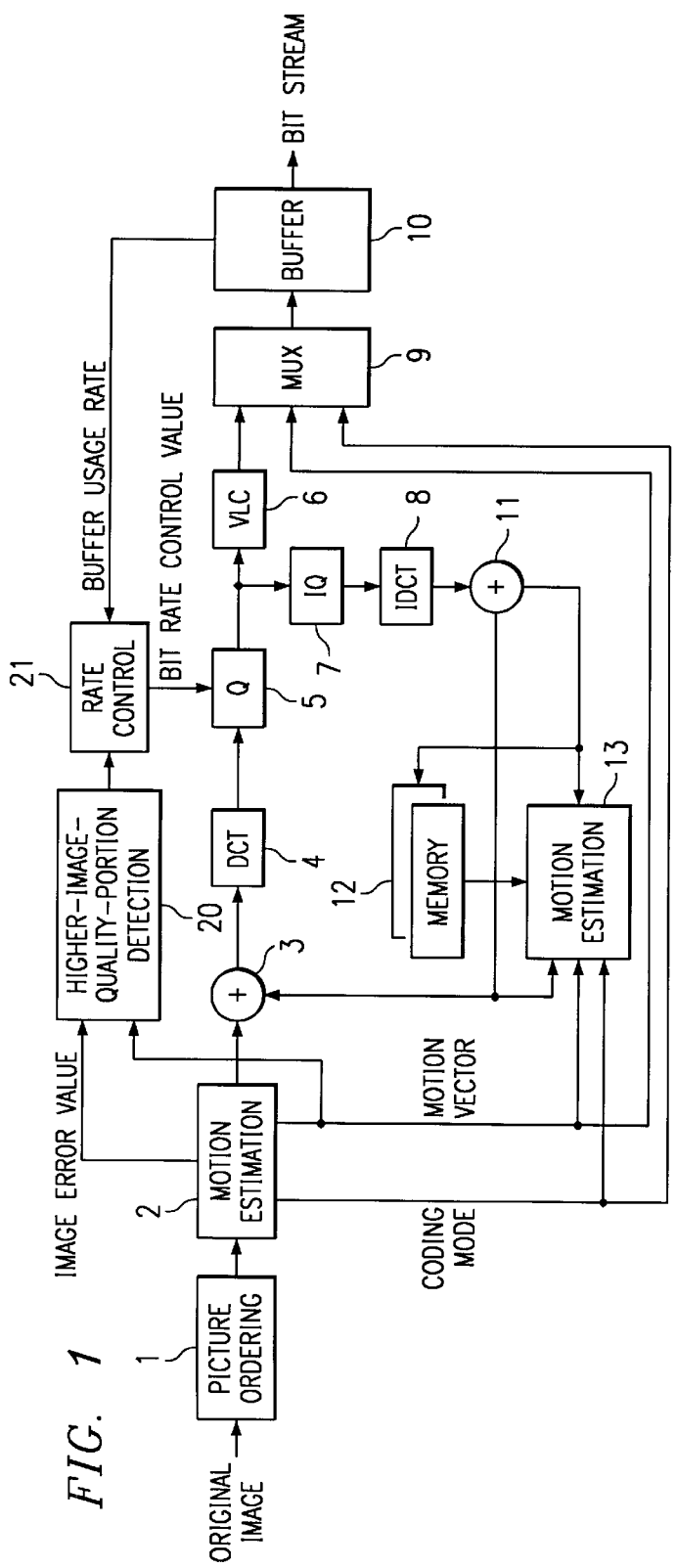
Figure 2:
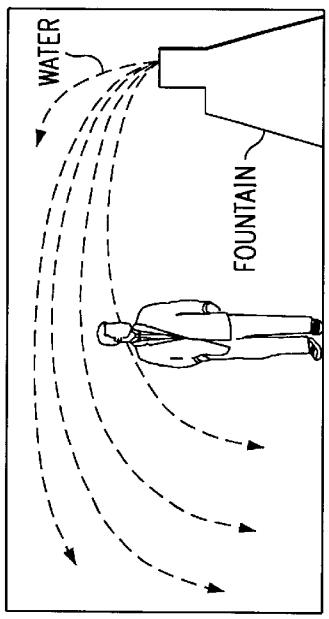
Figure 5:
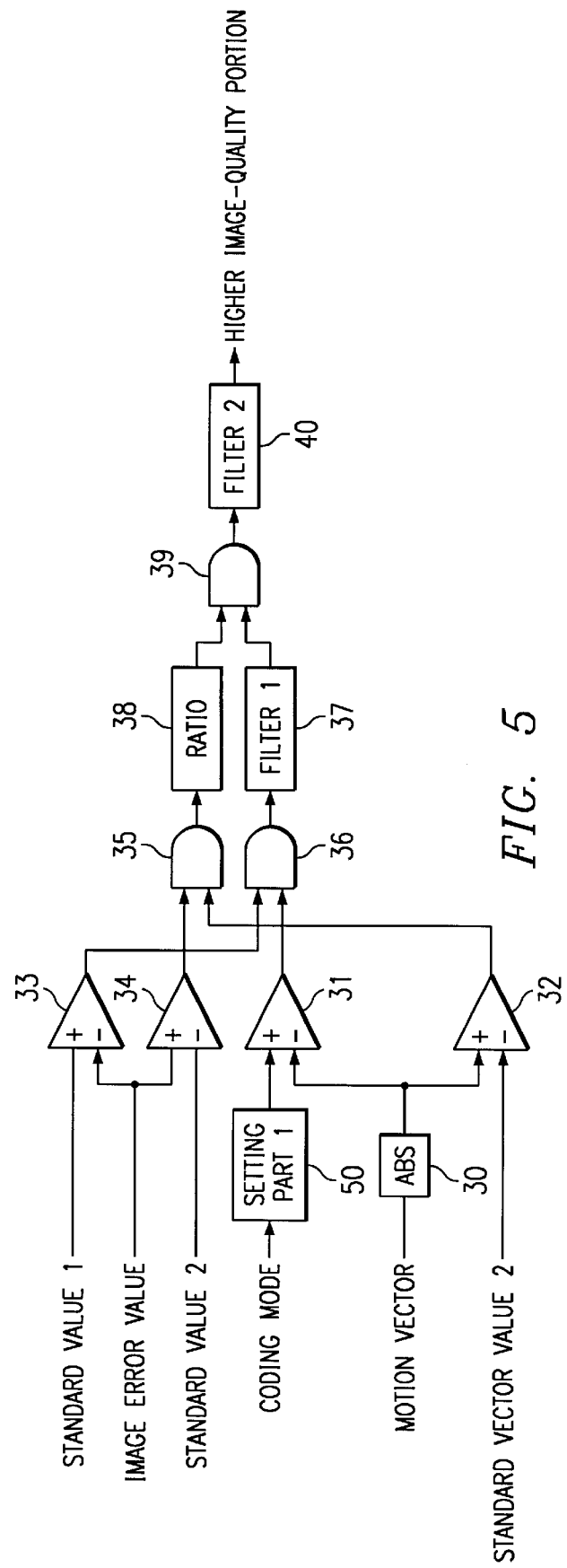

Drawing 3 is a block diagram of higher-image-quality-portion detection unit 20 of Drawing 1.

Drawing 4 is a block diagram of another example of higher-image-quality-portion detection unit 20 of Drawing 1.

Drawing 5 is a block diagram of higher-image-quality-portion detection unit 20 of an MPEG encoder for another embodiment of the present invention.

REFERENCE NUMERALS AND SYMBOLS AS SHOWN IN THE DRAWINGS

2 Motion inference unit, 20 Higher-image-quality-portion detection unit, 21 Bit rate control value correction unit

DETAILED DESCRIPTION

Embodiments of the present invention will be explained with reference to drawings 1 through 5.

Drawing 1 is a block diagram of the MPEG encoder for one embodiment of the present invention; the characterizing portion involves the provision of higher-image-quality-portion detection unit 20 and bit rate control value correction unit 21. In other words, higher-image-quality-portion detection unit 20 uses the image error value and the motion vector value from motion estimation unit 2 to detect the portion for which higher image quality is desired, and the detection result is output. Based on the buffer usage rate output from buffer 10 and the output from higher-image-quality-portion detection unit 20, bit rate control value correction unit 21 calculates a bit rate control value and outputs it to quantization unit 5. The image error value is the difference between the image currently being compressed—the 'uncompressed image' (the output of motion estimation unit 2)—and the image that is the result of correcting the 'uncompressed image,' with motion vectors.

In addition, with the MPEG encoder, motion vectors and an image error output are output for each region known as a 'macro block', so the detection is performed at higher-image-quality-portion detection unit 20 for each region of a prescribed size. In the following, this higher-image-quality-portion detection unit 20 will be explained in detail.

Drawing 3 shows a block diagram of one example of higher-image-quality-portion detection unit 20. For the motion vectors that are input, the absolute values are taken by means of, ABS 30, and are input to comparators 31 and 32 which judge their size. The positive side input of comparator 31 becomes the standard vector value 1, and if the output of ABS 30 is not less than this standard vector value 1, comparator 31 outputs a decision that this is a 'still portion.' As for comparator 32, the negative side input becomes standard vector value 2, and if the output of ABS 30 is greater than this standard vector value 2, comparator 32 outputs a decision that this is a 'portion with a large amount of motion'. Likewise for the image error value, comparators 33 and 34, which judge the size, are connected to each other. Comparator 33 outputs a decision regarding 'portions where there is little error'; comparator 34, 'portions with a large amount of error.' The outputs of comparators 31–34 are variously input to logical multipliers 35 and 36. Logical multiplier 35 takes the logical product of the output of comparators 34 and 32 and decides if there is 'a portion with a large amount of motion as well as a large amount of error.' In addition, logical multiplier 36 takes the logical product of the output of comparators 33 and 31 and decides if there is 'a still portion with little error.' Here, a still portion does not necessarily represent a vector value of 0; it can reflect 'extremely little motion.'

Time-directional filter 37, by means of time-directional filtering, improves the accuracy of detection of the output of logical multiplier 36, that is, 'still portions with little error'. Moving image portion ratio detection unit 38 counts the number of 'portions with a large amount of motion as well as a large amount of error' detected by logical multiplier 35, and when the number generated for a single screen is more than a prescribed value, it outputs a 'majority-of-moving-image-portions' signal. Here, the 'portions with a large amount of motion as well as a large amount of error' detected by logical multiplier 35 correspond to the water portion mentioned for the input image portion of the aforementioned prior art; moving image portion ratio detection unit 38 judges whether there are many of these types of images.

In the present embodiment, moving image portion ratio detection unit 38 detects the ratio for a single image and outputs that result for use with the next image. Based on the outputs of moving image portion ratio detection unit 38 and time-directional filter 37, logical multiplier 39 outputs a decision that within a single screen the number of 'portions with a large amount of motion as well as a large amount of error' is above a fixed value, and that the currently compressed (quantized) portion is a 'still portion with little error.' This output represents the higher-image-quality portion. Based on the result of this decision, bit rate control value correction unit 21 further reduces by ½ the bit rate control value that is calculated from the buffer usage rate, and outputs it to quantization unit 5. As a result, the quantization step becomes smaller and blurring of still image portions is minimized.

Drawing 4 is a is a block diagram of another example of the higher-image-quality-portion detection unit 20. With respect to the example in Drawing 3, intra-image interpolation filter 40 is added as a second filter. Filter 40 is an interpolation filter for correcting the decision to 'higher-picture-quality-portion' when logical multiplier 39 decides that a portion is 'not a higher-picture-quality-portion' but there is a 'higher-picture-quality-portion' on the periphery in contact with that portion. By providing this filter it is possible to perform higher-picture-quality processing with respect to blocks being processed that include still images and moving images.

As another embodiment of an MPEG encoder, there is one for which the input to higher-image-quality-portion detection unit 20 of the MPEG decoder shown in Drawing 1 can be a coding mode signal from motion estimation unit 2, in addition to the image error value and the motion vector. The details are shown in Drawing 5. Setup unit 50 is the part that establishes standard vector value 1. By means of the coding mode, this setup unit 50 changes the standard vector such that logical multiplier 31 can judge an image with extremely slow motion as a still image. For example, when motion estimation unit 2 detects a motion vector, it is detected based on two images separated in time, but the standard vector value is increased in proportion to the difference in time between those two images.

The present invention has been explained above in reference to embodiments, but it is not limited to these examples.

With the MPEG encoder of the present invention, by detecting still image portions and moving image portions, and by making the quantization step smaller for the still image portions, degradation of an image due to compression of still image portions can be reduced.

What is claimed is:

1. An image information encoding method comprising the following steps:

detecting an image portion for which higher image quality is desired based on motion vector value and image error value, calculating at bit rate control value based on said detection result as well as a buffer usage rate, changing a coarseness of quantization based on said bit rate control value.

2. An image information encoding system comprising:

a circuit for detecting an image portion for which higher image quality is desired is detected based on motion vector value and image error value;

a circuit for calculating a bit rate control value based on said detection result as well as a buffer usage rate; and a circuit for changing a coarseness of the quantization step based on said bit rate control value.

3. The image information encoding system of claim 2 wherein the circuit for detecting an image portion comprises:

an absolute value circuit to output the absolute value of a motion vector;

a first comparator to compare a first standard value with a image error value;

a second compartor to compare a second standard value with a image error value;

a third comparator to compare a first standard vector value with the absolute value of the motion vector;

a fourth comparator to compare a second standard vector value with the absolute value of the motion vector;

a first logical multiplier to take the logical product of the second and fourth comparators;

a second logical multiplier to take the logical product of the first and third comparators;

a moving image portion ratio detection circuit connected to the output of the first logical multiplier;

a time directional filter to output majority of image portion moving signal;

a third logical multiplier to take ouputs from the moving image portion ratio detection circuit and the time directional filter to output said image portion for which higher image quality is desired.

4. The image information encoding system of claim 3 further comprising a second filter connected to filter the output of the third logical multiplier to output said image portion for which higher image quality is desired.

5. The image information encoding system of claim 4 further comprising a setup unit which increases the first standard vector value in proportion to a time difference between two images.

6. An image encoder circuit for encoding a sequence of video images comprising:

a first circuit for detecting what portion of an image that has a large amount of motion as well as a large amount of error and comparing the detected portion to a prescribed value;

a second circuit for detecting what portion of the image that has a small amount of motion as well as a small amount of error;

a third circuit which inputs an output from the first and second circuits to determine a higher-image-quality-portion of the image;

a fourth circuit for calculating a bit rate control value based an output from the third circuit and a buffer usage rate; and a fifth circuit which changes the image quantization based on an output of the fourth circuit.

* * * * *